United States Patent [19]

Hanson

[11] Patent Number: 4,760,800
[45] Date of Patent: Aug. 2, 1988

[54] REVERSIBLE KNICK KNACK SHELF

[76] Inventor: Palmer Hanson, 1708 Susan Ct., SE., Tumwater, Wash. 98501

[21] Appl. No.: 12,149

[22] Filed: Feb. 9, 1987

[51] Int. Cl.⁴ ............... A47B 47/04; A47B 96/02
[52] U.S. Cl. ..................... 108/111; 108/42; 108/59; 108/152
[58] Field of Search ............... 108/111, 59, 156, 42, 108/101, 91, 152, 108; 312/238; 211/187, 188, 194, 90, 2, 134

[56] References Cited

U.S. PATENT DOCUMENTS

| 1,401,057 | 12/1921 | Elliott | 108/101 |
| 1,431,823 | 10/1922 | Leconte | 108/114 |
| 1,989,849 | 2/1935 | Davies | 108/101 |
| 3,082,712 | 3/1963 | Trautmann et al. | 108/64 X |
| 3,217,672 | 11/1965 | Haughey | 108/106 |
| 3,538,862 | 11/1970 | Patriarla | 108/59 |
| 3,741,404 | 6/1973 | Jourdain | 109/91 |
| 3,919,950 | 11/1975 | Frazelle | 108/108 X |
| 4,217,832 | 8/1980 | Pozzan | 108/64 X |
| 4,223,613 | 9/1980 | Yoshizawa | 108/64 |
| 4,345,526 | 8/1982 | Streit | 108/101 X |

FOREIGN PATENT DOCUMENTS 2011390 9/1971 Fed. Rep. of Germany ........ 108/64

Primary Examiner—Kenneth J. Dorner
Attorney, Agent, or Firm—Sherman Levy

[57] ABSTRACT

A reversible knick knack shelf is provided that can be used for homes and offices and wherein various articles can be held or supported thereon. The shelf assembly and unit can sit on a desk, table, or other flat surface. Different means can be provided for interconnecting the support members together as, for example, hollow tubular members can be provided for interconnecting the shelves or support members.

5 Claims, 1 Drawing Sheet

FIG. 1
FIG. 2
FIG. 4
FIG. 3
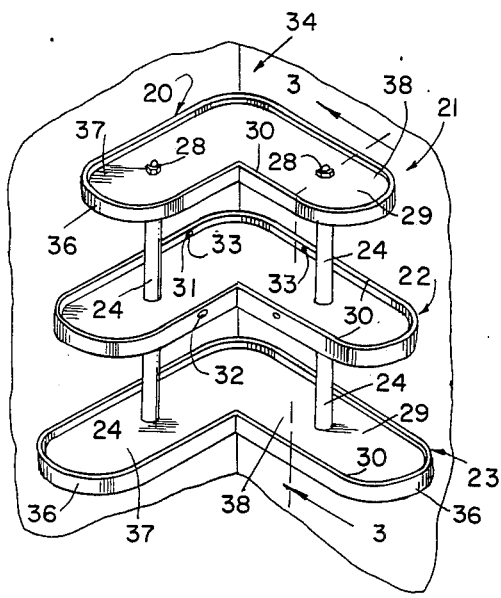
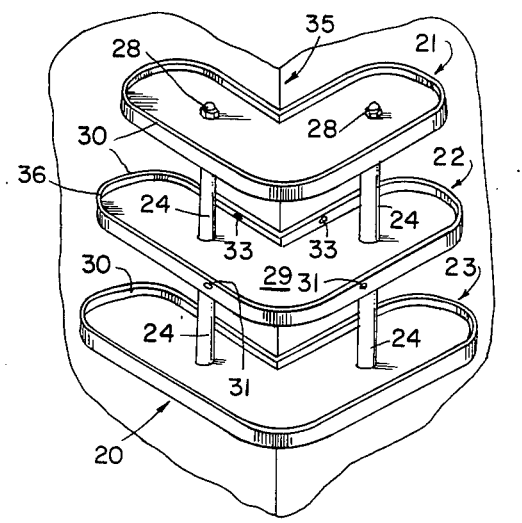
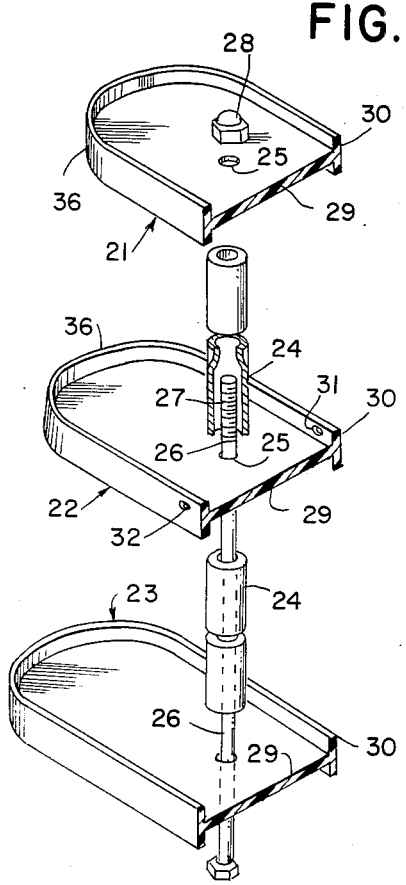
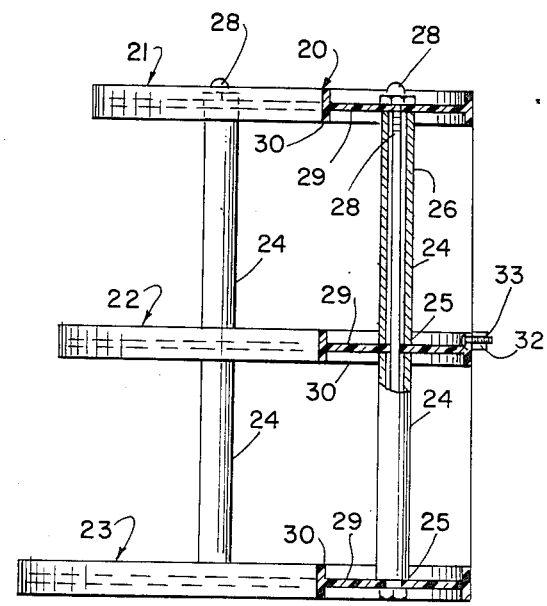

REVERSIBLE KNICK KNACK SHELF

The present invention relates to a shelf and more particularly to a knick knack shelf for holding various articles.

An object of the present invention is to provide a shelf unit or assembly that includes a plurality of horizontally disposed spaced parallel support members that are interconnected together by means of rods, and where spacers are interposed between the support members or individual shelves.

Another object is to provide a knick knack shelf that is adapted to be used for home and office use, and wherein various types of articles or items can be conveniently supported thereon, such as cosmetics, jewelry, paint supplies, knick knacks and the like, and wherein the shelf can be readily and conveniently fastened to inside and outside corners of a wall.

Another object is to provide a device of the character described that may be utilized conveniently in various locations, and further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIG. 1 is a perspective view illustrating the knick knack shelf of the present invention fastened to an inside corner of a wall.

FIG. 2 is a perspective view illustrating the device fastened to an outside corner of a wall.

FIG. 3 is an enlarged view taken on the line 3—3 of FIG. 1.

FIG. 4 is an enlarged perspective view, with parts broken away and in section, showing certain constructional details and with parts separated for clarity of illustration.

Referring in detail to the drawings, the numeral 20 indicates the knick knack shelf of the present invention in its entirety, and as shown in the drawings the shelf unit or assembly 20 includes a plurality of spaced parallel horizontally disposed support members or individual shelves 21, 22 and 23.

Interposed between the shelves 21, 22 and 23 are hollow tubular spacers 24 that register with aligned openings 25 in the support members 21, 22 and 23. The numeral 26 indicates rods that are vertically disposed and the rods 26 extend through the registering openings 25 and through the tubular spacers 24, as shown in the drawings. End portions 27 of the rods 26 are threaded whereby suitable fasteners such as the nuts 28 can be arranged in threaded engagement with the portions 27 for maintaining the parts in their proper assembled position or relation.

It will be seen that the shelves 21, 22 and 23 are of different sizes, so that for example, as shown in the drawings, the upper shelf or support member 21 is smaller than the intermediate member 22, and the member 22 is smaller than the lowermost member 23. Thus, a stepped arrangement is provided. This arrangement can be reversed so that the larger support member is at the top and the smaller support member is at the bottom, if desired.

The support members include a main flat section 29 as well as a continuous flange portion 30. As shown in FIG. 1, the shelf unit 20 may be fastened to an inner corner 34 of a wall by means of screws 33 that are adapted to be extended through apertures or openings 31 in the flange portion 30 of the intermediate member 22 or as shown in FIG. 2, the knick knack shelf 20 of the present invention can be fastened to an outer corner 35 of a wall by means of screws 33 that are extended through openings or apertures 32 in the opposite side portion of the intermediate member 22.

It is noted that each of the support members 21, 22 and 23 have generally rounded or curved end portions 36. In addition, each of the support members 21, 22 and 23 has a substantially right angled formation so that each support member includes portions or sections 37 and 38 that are arranged at right angles or approximately at 90° relationship to each other.

From the foregoing, it will be seen that there has been provided a knick knack shelf, and in use with the parts arranged as shown in the drawings, the knick knack shelf 20 of the present invention can be arranged in various locations. For example, as shown in FIG. 1, the shelf 20 may be arranged adjacent to and fastened to an inner corner 34 of a wall, and with the parts arranged as shown in FIG. 1, securing elements such as screws 33 can be extended through the openings 31 and into engagement with the wall to maintain the shelf fastened to the wall. Or, the shelf 20 can be arranged as shown in FIG. 2 so that it is adjacent to and fastened to the outer corner 35 of a wall instead of the inner corner 34. When using the device as shown in FIG. 2, screws 33 are adapted to be inserted through the openings 32 and into engagement with the wall for maintaining the shelf in its desired location. The knick knack shelf is reversible because it can be used against an inner corner or else it can be used against an outer corner of a wall or the like. Or, the device can be merely arranged on a desk, table, or other supporting surface without using the screws 33.

The parts can be made of any suitable material and in different shapes or sizes as desired or required.

The shelf 20 includes the members 21, 22 and 23 that are of different sizes so that, for example, as shown in the drawings, the upper member 21 is of smaller size than the intermediate member 22, and the member 22 is smaller than the lowermost member 23. Thus, a stepped arrangement of shelves is provided. This arrangement can be reversed so that, for example, the top member can be arranged as the larger, and the bottom member can be the smaller.

Each of the support members includes the continuous flange 30, and this serves to assure that small articles will not accidently roll off or fall off of the support members. Also, each of the support members has a right angular configuration, and this assures that the device is reversible, because it will snugly fit against inner corners or outer corners, as shown in FIGS. 1 and 2. The plurality of support members are conveniently fastened together by means of the rods 26 which have the nuts or fasteners 28 thereon, and the spacers 24 serve to maintain the support members in their proper spaced apart relation with respect to each other.

The rods 26 may be made of steel, and the spacers 24 may be made of plastic tubes, and these spacers function as supports. It will, therefore, be seen that there has been provided a reversible knick knack shelf that can be used in various locations such as a table, or it can be hung on inside or outside corners of walls. The device can be used for home use or office use or for other purposes. The device will fit inside corners or outside corners of walls, and the purpose of the reversible knick knack shelf of the present invention is to provide a convenient device for home and office use that can be used for various purposes. Thus, the shelf will hold cosmetics, jewelry, paint supplies, knick knacks, and the like. The shelf can be made of durable transparent plastic and can be readily fastened to inside and outside corners of a wall. It can also sit on a desk or table or any flat surface, and it can be easily manufactured, assembled, and disassembled for packaging and shipping and the like. Thus, the present invention is adapted to be used for a multitude of purposes.

The center shelf has holes in the ledge or flange of the shelf on inside and outside for nails or screws, so as to permit the shelf to be hung on a wall. The tubing 24 can be made of transparent plastic and has the bolts or rods extending therethrough so that the shelf will be maintained rigid. The parts can be readily fabricated or manufactured from plastic using suitable molds and the like.

It will therefore be seen that there has been provided a reversible knick knack shelf which can be made transparent or in different colors. The device can be used for inside or outside corners. The device can also be used in pairs and may be set on a dresser or vanity, and the device is ideal for the bathroom or children's rooms. The present invention is useful for such items as knick knacks, trophies, jewelry, framed pictures or holding artists' trays and for supporting miniature collections or hobbies and the like and the device is easy to assemble.

The device consists of the plurality of shelves or support members which may have bushings or hollow cylinders formed molded integrally with the support members. Such bushings may be interconnected by hollow tubular members that have their ends open, and the inside diameter of the tubular members is of a size to snugly receive the bushings so that the shelves or support members can be maintained in the proper assembled position. These tubular members while snugly fitting on the bushings have a fit so that when sufficient manual pressure is applied to the tubular members, the tubular members can be readily connected to or disconnected to the bushings as desired or required. The tubular members are of uniform diameter throughout their length.

The reversible knick knack shelf described herein will fit into an inside or outside corner. Also, the device can be fastened to an inside or outside corner wall. The present device can be hung on a wall and the reversible knick knack shelf fits both inside and outside corners. The device can be made of high impact acrylic material or other suitable material. The device can be made so that it will be in different sizes such as three tiers or the like. The tubular members function as spacers.

Although the invention has been herein shown and described on what is conceived to be the most practical and preferred embodient, it is recognized that departures may be made therefrom within the scope of the invention, which is not to be limited to the details disclosed herein, but is to be accorded the full scope of the claims so as to embrace any and all equivalent devices and apparatus.

I claim:

1. A reversible knick knack, knock down shelf comprising a plurality of spaced parallel horizontally disposed support members of different sizes, hollow tubular spacers interposed between said support members, there being aligned openings in said support members registering with said spacers, vertically disposed rods extending through said openings and spacers, fasteners engaging threaded portions of said rods, said support members having continuous flanges thereon, said support members being of different sizes so that a stepped effect is provided, each of said support members including a main flat section, and each support member including portions arranged at right angles with respect to each other, there being apertures on the flanges of the support members, said apertures adapted to receive securing elements for permitting the reversible knick knack shelf to be fastened to inner and outer corners of walls.

2. The structure as defined in claim 1 wherein the ends of said support members are of rounded formation.

3. A reversible knick knack shelf comprising a plurality of spaced parallel, horizontal disposed support members of different sizes, cylindrical bushings integral with said support members, vertical disposed tubular members having their ends open for snugly engaging and receiving said bushings, said tubular members being of uniform diameter throughout their length, the interior diameter of the tubular members being of a size so as to snugly receive the bushings, said support members having continuous flanges thereon, said support members being of different sizes so that a stepped effect is provided, each of said support members including a main flat section, and each support member including portions arranged at right angles with respect to each other, there being apertures in the flanges or the support members, said apertures adapted to receive securing elements for permitting the reversible knick knack shelf to be fastened to inner and outer corners of walls, the ends of the support members being rounded.

4. In a reversible knick knack shelf for fastening to the inside and outside corners of a wall, a plurality of spaced parallel, horizontal disposed support members of different sizes, so that there is provided at least an upper support member, an intermediate support member, and a lowermost support member, the intermediate support member being of a different size than the upper support member and the lower support member so that a stepped effect is provided, hollow tubular spacers interposed between said support members, there being aligned openings in said support members registering with said spacers, vertically disposed rods extending through said openings and said spacers, said rods having thredded end portions, fasteners engaging the thredded end portions of said rods, said support members each including a main flat section having continuous flanges thereon, portions of said flanges extending above the support member, and portions of the flanges extending below the support members; each of said support members including portions arranged at right angles at approximately 90 degrees with respect to each other, there being apertures in at least the flanges of the intermediate support member, said apertures adapted to receive securing elements for permitting the reversible knick knack shelf to be fastened to inner and outer corners of walls, the ends of the support members having curved portions, the support members providing shelves so that the unit can be reversed to fit inside corners or outside corners of walls.

5. The structure as defined in claim 4 and further including cylindrical bushings integral with said support members, vertically disposed hollow tubular members having their ends open for snugly engaging and receiving said bushings, said tubular members being of uniform diameter throughout their length and the interior diameter of the tubular members being of size so as to snugly receive the bushings.

* * * * *